United States Patent
Charters et al.

(10) Patent No.: US 9,223,566 B2
(45) Date of Patent: Dec. 29, 2015

(54) MANAGING A SET OF SOFTWARE MODULES IN A SOFTWARE RUNTIME ENVIRONMENT

(71) Applicant: INTERNATIONAL BUSINESS MACHINES CORPORATION, Armonk, NY (US)

(72) Inventors: Graham C. Charters, Southampton (GB); Andrew J. Osborne, Eastleigh (GB); Timothy J. Ward, Southampton (GB); Christopher Wilkinson, Lyndhurst (GB)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 14/029,032

(22) Filed: Sep. 17, 2013

(65) Prior Publication Data

US 2014/0096110 A1    Apr. 3, 2014

(30) Foreign Application Priority Data

Oct. 2, 2012    (GB) .................................. 1217574.1

(51) Int. Cl.
*G06F 9/44*    (2006.01)
(52) U.S. Cl.
CPC .. *G06F 8/70* (2013.01); *G06F 8/36* (2013.01); *G06F 8/71* (2013.01)
(58) Field of Classification Search
CPC ................ G06F 8/70; G06F 8/71; G06F 8/36
See application file for complete search history.

(56) References Cited

U.S. PATENT DOCUMENTS

| 5,421,016 A | 5/1995 | Conner et al. |
| 5,758,160 A * | 5/1998 | McInerney et al. ........... 717/104 |
| 7,260,818 B1 * | 8/2007 | Iterum et al. .................. 717/170 |
| 7,490,317 B1 | 2/2009 | Hahn et al. |
| 7,680,818 B1 * | 3/2010 | Fan et al. ............... 707/999.103 |

(Continued)

FOREIGN PATENT DOCUMENTS

WO    2011101206 A1    8/2011

OTHER PUBLICATIONS

Cervantes, Humberto, and Richard S. Hall, Automating service dependency management in a service-oriented component model., [Online] 2003, ICSE CBSE Workshop. 2003, [Retrieved from the Internet] <http://www-adele.imag.fr/Les.Publications/intConferences/CBSE2003Cer.pdf> 6 pages.*

(Continued)

*Primary Examiner* — Thuy Dao
*Assistant Examiner* — Ravi K Sinha
(74) *Attorney, Agent, or Firm* — Law Office of Jim Boice (57) ABSTRACT

A method, system, and/or computer program product manages a set of software modules in a software runtime environment, where the set of software modules has one or more dynamic dependencies and one or more static dependencies. Each software module having a static dependency on another software module in a set of software modules is identified. Each subset of the set of software modules that is interdependent with another subset due to static dependencies between subsets is identified. In response to a change in state of a module in an identified subset, the change in state is applied to all modules in the identified subset.

12 Claims, 5 Drawing Sheets

(56) References Cited

U.S. PATENT DOCUMENTS

| | | | | |
|---|---|---|---|---|
| 8,006,230 | B2 | 8/2011 | Agarwal et al. | |
| 8,046,779 | B2 | 10/2011 | Wusthoff et al. | |
| 8,312,419 | B2* | 11/2012 | Wilcock et al. | 717/104 |
| 8,392,877 | B1* | 3/2013 | Chiluvuri | 717/107 |
| 8,578,329 | B1* | 11/2013 | Chiluvuri | 717/107 |
| 2002/0104071 | A1* | 8/2002 | Charisius et al. | 717/109 |
| 2004/0015812 | A1* | 1/2004 | Sreedhar | 717/100 |
| 2004/0088687 | A1 | 5/2004 | Dalton et al. | |
| 2004/0255272 | A1* | 12/2004 | Ondrusek et al. | 717/120 |
| 2006/0010425 | A1* | 1/2006 | Willadsen et al. | 717/120 |
| 2006/0161895 | A1* | 7/2006 | Speeter et al. | 717/121 |
| 2007/0180441 | A1* | 8/2007 | Ding et al. | 717/163 |
| 2007/0192340 | A1* | 8/2007 | Moulckers et al. | 707/100 |
| 2008/0040364 | A1* | 2/2008 | Li | 707/100 |
| 2008/0148231 | A1* | 6/2008 | Weber | 717/120 |
| 2008/0276231 | A1 | 11/2008 | Huang et al. | |
| 2009/0064099 | A1 | 3/2009 | Foley | |
| 2009/0100447 | A1* | 4/2009 | Beynon et al. | 719/329 |
| 2009/0113407 | A1* | 4/2009 | Sedukhin et al. | 717/168 |
| 2009/0216793 | A1 | 8/2009 | Szyperski et al. | |
| 2009/0249328 | A1* | 10/2009 | Wetherell et al. | 717/175 |
| 2010/0077386 | A1* | 3/2010 | Akkiraju et al. | 717/136 |
| 2010/0153908 | A1* | 6/2010 | Sarkar et al. | 717/104 |
| 2011/0029946 | A1* | 2/2011 | Joukov et al. | 717/100 |
| 2011/0283253 | A1* | 11/2011 | Dutta et al. | 717/105 |
| 2011/0283270 | A1* | 11/2011 | Gass et al. | 717/168 |
| 2013/0283259 | A1* | 10/2013 | Ellis et al. | 717/174 |
| 2014/0007043 | A1* | 1/2014 | Aliseychik et al. | 717/106 |
| 2014/0130013 | A1* | 5/2014 | Lim et al. | 717/121 |

OTHER PUBLICATIONS

Heejune Ahn, Hyukjun Oh, and Chang Oan Sung; Towards reliable OSGi framework and applications, [Online] 2006, in Proceedings of the 2006 ACM symposium on Applied computing (SAC '06). ACM, New York, NY, USA, [Retrieved from the Internet] <http://doi.acm.org/10.1145/1141277.1141617> pp. 1456-1461.*

Sangal et al., Using dependency models to manage complex software architecture, [Online] 2005, in Proceedings of the 20th annual ACM SIGPLAN conference on Object-oriented programming, systems, languages, and applications (OOPSLA '05). ACM, New York, NY, USA, [Retrived from the Internet] <http://doi.acm.org/10.1145/1094811.1094824> pp. 167-176.*

Xiao, C.; Tzerpos, V., Software Clustering Based on Dynamic Dependencies, [Online] Mar. 21-23, 2005, Software Maintenance and Reengineering, Ninth European Conference [Retrieved from the Internet] <http://ieeexplore.ieee.org/stamp/stamp.jsp?tp=&arnumber=1402121&isnumber=30442> pp. 124-133.*

Mancoridis et al., Bunch: a clustering tool for the recovery and maintenance of software system structures, [Online] 1999 Software Maintenance, 1999. (ICSM '99) Proceedings. IEEE International Conference on, [Retrieved from the Internet] <http://ieeexplore.ieee.org/stamp/stamp.jsp?tp=&arnumber=792498&isnumber=17178> pp. 50-59.*

Alzamil, Z.A. "Redundnt Coupling Detection Using Dynamic Dependence Analysis", IEEE Computer Society, International Conference on Software Engineering Advances, 2007, pp. 1-6.

GB Patent Application No. GB1217574.1: Search Report Mailed Feb. 5, 2013.

* cited by examiner

Module Dependency Table

| Module | Dependency Set Members |
|--------|------------------------|
| B | C |
| C | B |
| D | E,F |
| E | D, F |
| F | D, E |

MANAGING A SET OF SOFTWARE MODULES IN A SOFTWARE RUNTIME ENVIRONMENT

This application is based on and claims the benefit of priority from United Kingdom (GB) Patent Application 1217574.1, filed on Oct. 2, 2012, and herein incorporated by reference in its entirety.

BACKGROUND

The present invention relates to managing a set of software modules in a software runtime environment.

Computer systems commonly run application programs comprising a set of interdependent software modules provided in a software runtime environment. Such software modules may comprise dynamic dependencies with each other. Dynamic dependencies are managed by the software runtime environment such that the application program provided by the set of modules can continue to function despite appearance or disappearance of a relevant dependency. Dynamic software modules can thus have independent lifecycles; that is, they may be started, stopped, upgraded, replaced or removed regardless of the state of the other modules providing the relevant application program. For example, an administrator may change the lifecycle state of a given software module resulting in a change in dependencies. The dependencies are dynamically rearranged so as to enable the application program to continue to run, perhaps with reduced functionality.

Dynamic software runtime environments may allow the use of software modules comprising static dependencies, that is, dependencies on other software modules that are continuously required at runtime to enable the correct functioning of the relevant interdependent software modules. Such statically dependent software modules are commonly run within a wrapper arranged to adapt the statically dependent software module so as to enable it to operate within the dynamic software runtime environment. Such statically dependent software modules may be legacy software modules.

Exposing such statically dependent software modules to a dynamic software runtime environment can cause issues resulting from lifecycle state changes. For example, given two statically interdependent software modules, if one has its lifecycle state changed from running to stopped, this will cause a fault with the other and potentially a resulting issue with the application program that the modules contribute to. Furthermore, when dynamic software modules make use of static software modules, the dynamic software modules may effectively gain a static dependency. This results in the dynamic software modules not behaving dynamically as would otherwise be expected.

SUMMARY

A method, system, and/or computer program product manages a set of software modules in a software runtime environment, where the set of software modules has one or more dynamic dependencies and one or more static dependencies. Each software module having a static dependency on another software module in a set of software modules is identified. Each subset of the set of software modules that is interdependent with another subset due to static dependencies between subsets is identified. In response to a change in state of a module in an identified subset, the change in state is applied to all modules in the identified subset.

BRIEF DESCRIPTION OF THE SEVERAL VIEWS OF THE DRAWINGS

Embodiments of the invention will now be described, by way of example only, with reference to the following drawings in which.

DETAILED DESCRIPTION

Figure 1:
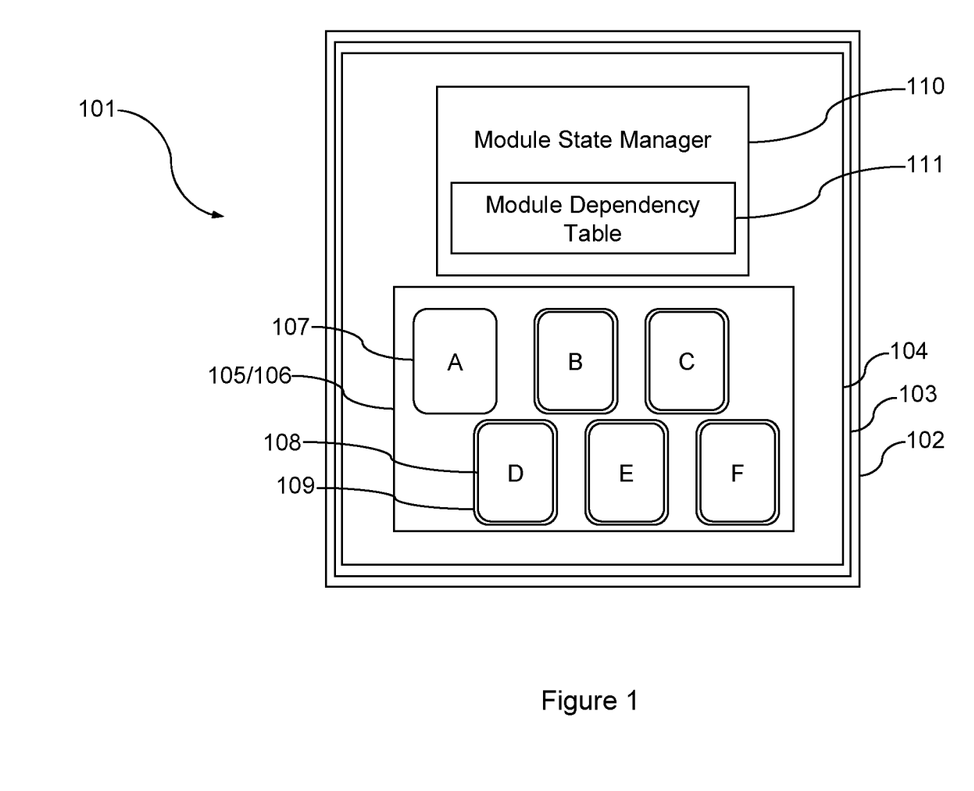
FIG. 1 is a schematic illustration of a computer system providing a software runtime environment.

With reference now to the figures, and specifically to FIG. 1, a computer system 101 comprises a computer 102 running an operating system 103 arranged to provide a processing environment for one or more application programs. In the present embodiment, the computer 102 is running a software runtime environment (SRE) application program 104 arranged to provide an OSGi (Open Services Group infrastructure) compliant software runtime environment for dynamic software modules. The SRE 104 is arranged to enable a set of software modules 105 to provide an application program 106. The set of software modules 105 may comprise one or more dynamic software modules 107 (A) and one or more static software modules 108 (B, C, D, E, F). Each static software module 108 is contained in a wrapper 109 so as to enable its operation within the dynamic SRE 104. In the present embodiment, the static modules comprise Java™ Enterprise Edition (JEE) software modules in the form of Enterprise JavaBeans (EJBs) each wrapped in a respective Enterprise JavaBean (EJB) container so as to enable their operation within the OSGi SRE 104. In the present embodiment, the dynamic software module 107 is an OSGi bundle. Java™ and all Java™-based trademarks and logos are trademarks or registered trademarks of Oracle™ and/or its affiliates.

In the present embodiment the SRE 104 is provided with a module state manager (MSM) 110, which comprises a module dependency table 111. The MSM 110 is arranged to derive the module dependency table 111 from static dependencies identified in the set of static software modules 108. In the present embodiment, the MSM 110 is arranged to identify the static dependencies automatically when the set of static software modules 108 are deployed in the SRE 104. The dependencies are identified by searching the files that comprise the set of static software modules 108 for a predetermined set of one or more code constructs that each comprise a static dependency, that is, a reference from one of the static modules 108 to another of the static modules 108. For example, given a first static module 108 in the form of an EJB module 108, a static dependency is identified within its code by the term or code construct "@EJB" followed by a reference to a second EJB module 108. The MSM 110 is thus arranged, in the present embodiment, to automatically identify such a code construct and to extract the associated reference as a dependency of the first static module 108 on the second static module 108.

Once the MSM 110 has searched the set of static software modules 108, the extracted dependencies are then grouped into subsets of static modules 108 that are interdependent by static dependencies. The identified groups are then used to populate the module dependency table 111 as described further below. The compiled module dependency table 111 thus comprises data representing one or more subsets of the static software modules 108 wherein each member of a given subset is dependent on one or more other members of the subset as a result of a static dependency between those members.

The MSM 110 is arranged to use the dependency table 111 during the operation of the application program 106 in response to any lifecycle change requests input to the SRE 104 by a user or other system. Such lifecycle change requests may comprise a request to start, stop, upgrade, replace or remove a requested set of one or more of the static or dynamic modules 107, 108. The MSM 110 uses the data in the dependency table 111 to identify the other static modules 108 that are in the same subset as the requested set of one or more of the static modules 108, that is, those static modules 108 that are interdependent by one or more static dependencies on the requested set of modules. The MSM 110 is then arranged to apply the requested lifecycle change to both the requested set of one or more static modules 108 and the identified interdependent static modules 108.

Figure 2:
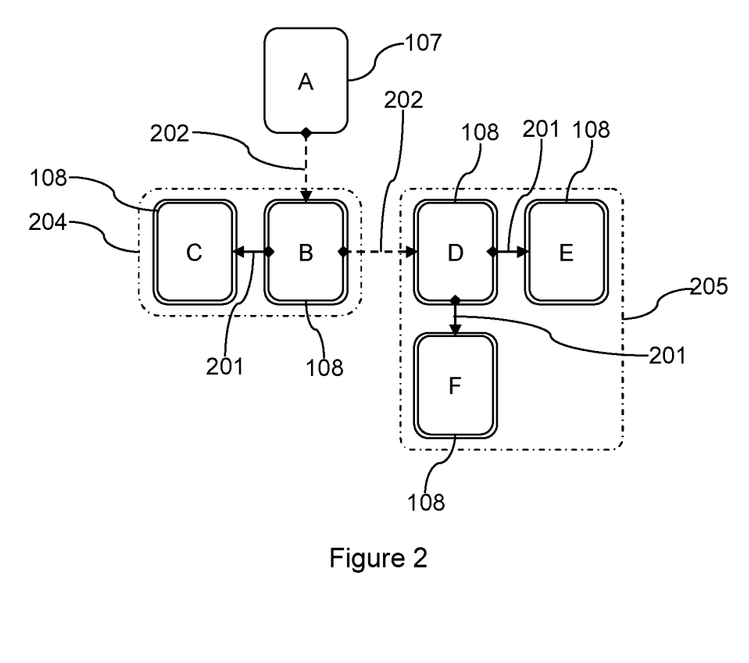
FIG. 2 is a schematic illustration of a set of modules in the software runtime environment of FIG. 1.

FIG. 2 illustrates the set of software modules 105 that provide the application program 106 and the static 201 and dynamic dependencies 202 between each module of the set. As will be understood by those skilled in the art, the dynamic dependencies 202 are identified and managed by the SRE 104. In other words, in the present embodiment, the MSM 110 identifies and manages the static dependencies 201 while the dynamic dependencies 202 are managed automatically by the normal processing of the SRE 104. As noted above, the identified static dependencies 201 are used by the MSM 110 to automatically identify the subsets 204, 205 of the static software modules 108 that are interdependent by static dependencies 201. In other words, the subsets 204, 205 each comprise groups of static modules 108 interlinked by one or more static dependencies 201. Each such subset 204, 205 is linked to another such subset 204, 205 or dynamic module 107 by one or more dynamic dependencies 202.

In the present embodiment, dynamic software module "A" 107 is an OSGi module bundle with a dynamic dependency 202, in the form of an OSGi service, on software module "B" 108 in the form of a Web OSGi bundle. Static software module "B" 108 comprises a static dependency 201 on static software module "C" 108 in the form of an Enterprise JavaBeans™ (EJB) module. As noted above, the static dependency 201 between the respective static modules "B" & "C" 108 is identified by an "@EJB" code construct and associated reference within the code of the static software module "B" 108. This identified static dependency 201, in conjunction with the other identified static dependencies 201 is then used to identify the subsets 204, 205 of static modules 108 that are interdependent by one or more such static dependencies 201.

Figure 3:
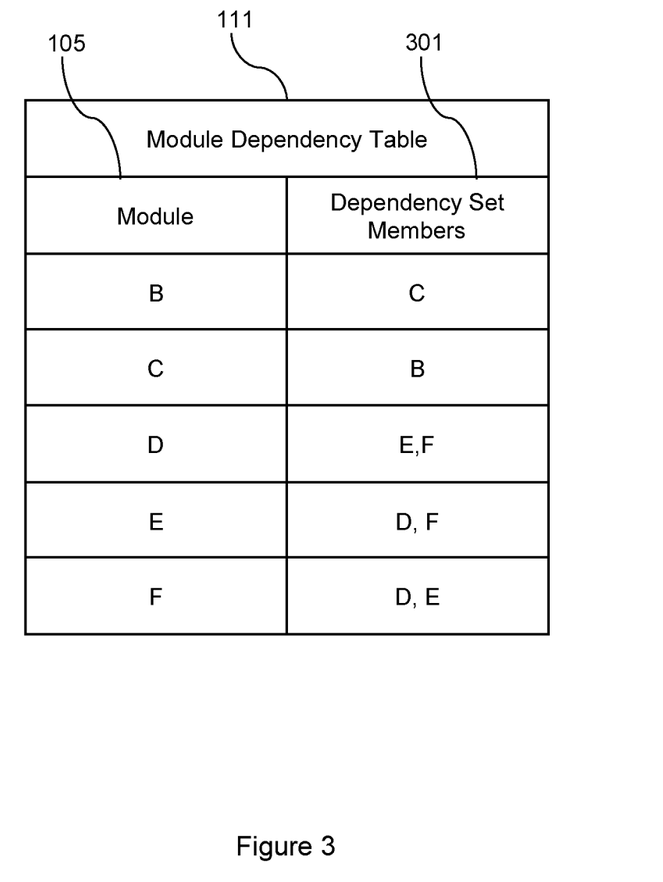
FIG. 3 is a table of dependencies in the set of modules of FIG. 2.

With reference to FIG. 3, each of the identified subsets 204, 205 is stored in the module dependency table 111 as a corresponding dependency set 301. In the present embodiment, the module dependency table 111 is indexed for each of the static modules 108, with the corresponding entry providing a list of the other static modules 108 that are members of the same the dependency set 301 as the indexing module 108. Thus, in the present embodiment, the module dependency table 111 comprises an entry for each static software module 108 in the SRE 104. Only dependency sets of subsets of modules interlinked by static dependencies are stored in the dependency set table. Any module not present in the module dependency table 111 is assumed to be dynamically dependent on other modules 107, 108 and thus can have its lifecycle state changed independently.

As noted above, the module state manager (MSM) 110 is arranged during runtime to detect any attempt within the SRE 104 to change the state of one or more of the static modules 108. For example, the SRE 104 or a user may intervene in the operation of one or more of the static modules 108 to change its lifecycle state from started, stopped, upgraded, replaced or removed to another such state. In response to such an attempt, the MSM 110 is arranged to use the module dependency table 111 to determine which other static modules 108 are dependent on the module 108 for which a change in state is requested. In other words, the MSM 110 uses the module dependency table 111 to identify the other members of the subset 204, 205 of modules that are interlinked by one or more static dependencies 201. The MSM 110 is then arranged to apply the requested state change to all members of the identified subset 204, 205. Thus, any state change of a member of a dependency set 301 results in a change in state for all members of the set 301 and ensures that no static dependency 201 is broken between any of the set of modules 107, 108 as a result.

Figure 4:
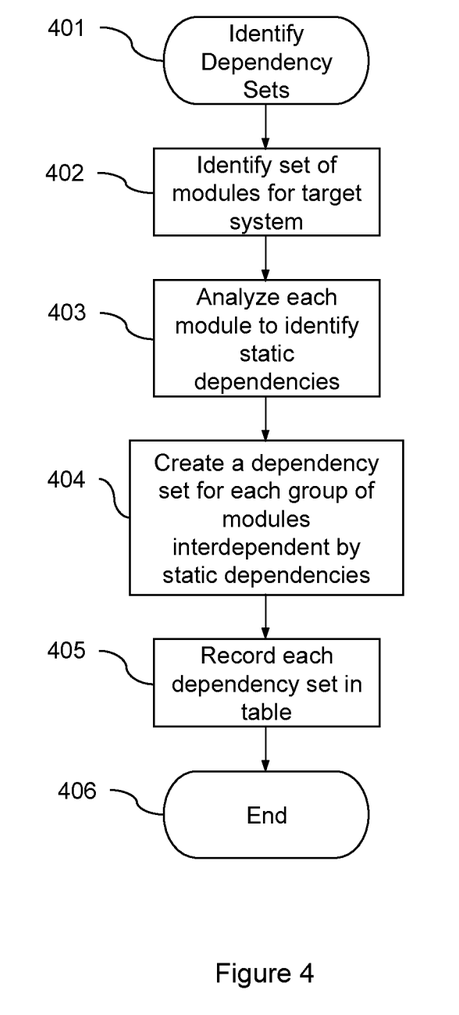
FIG. 4 is a flow chart illustrating processing for identifying the dependencies of FIG. 2.

The processing performed by the MSM 110 when compiling the dependency sets 301 for the set of software modules 105 will now be described with reference to the flow chart of FIG. 4. Processing is initiated at step 401 in response to deployment of the set of software modules 105 for an application program 104 in the SRE 104 and processing moves to step 402. At step 402 each of the static modules 108 comprising the relevant application program 104 is identified and processing moves to step 403. At step 403 static dependencies 201 are identified between the static modules 108 and processing moves to step 404. At step 404 the identified static dependencies are used by the MSM 110 to identify the subsets 204, 205 of the set of modules 105 and processing then moves to step 405. At step 405 each identified subset 204, 205 is used by the MSM 110 to create corresponding dependency sets 301, one for each member in the relevant subset 204, 205, in the dependency set table 111. Processing then moves to step 406 and ends.

Figure 5:
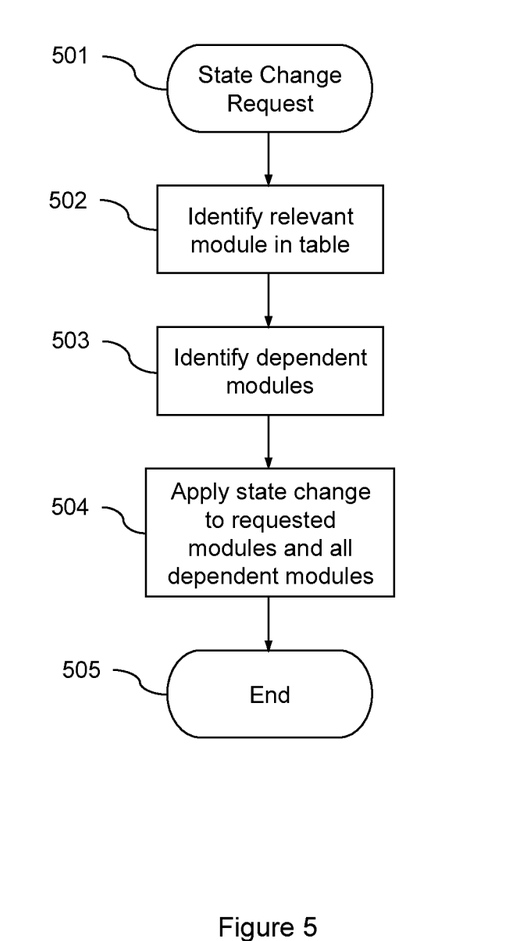
FIG. 5 is a flow chart illustrating the processing performed in the software runtime environment of FIG. 2 in response to a requested change in state of one of the modules of FIG. 2.

The processing performed by the MSM 110 during runtime in response to a request to change the state of one of the set of modules 105 will now be described with reference to the flowchart of FIG. 5. Processing is initiated at step 501 in response to a request to change the state of one or more static modules 108 during runtime and processing moves to step 502. At step 502 each of the relevant static modules 108 is identified in the module dependency table 111 and processing moves to step 503. At step 503 the other static modules 108 in the dependency set 301, if any, are identified and processing moves to step 504. At step 504 the state change requested in step 501 is applied to all of the identified static modules 108 in the identified dependency set 301. Processing then moves to step 505 and ends.

In another embodiment, the module dependency table comprises a single entry for each dependency set.

As will be understood by those skilled in the art, the identification of dependencies between modules or bundles may be performed by any suitable dependency analysis or identification application program arranged to operate with the relevant operating system or SRE and appropriate software code language. As will be understood by those skilled in the art, dependencies between software modules or bundles or any other software element may be identified automatically or manually during any one or more of the development, deployment or runtime phases of the relevant software modules, bundles or elements. An example of a dependency analysis tool for use during the development phase is the Bundle (Bnd) tool in the OSGi SRE 104. During deployment the relevant Enterprise JavaBean (EJB) container, a component of a Java™ Enterprise Edition (EE) server, such as the IBM® WebSphere® Application Server, is arranged to process annotations defining dependencies on software modules or bundles containing Enterprise JavaBeans (EJBs) so as to identify static dependencies. IBM and WebSphere are trademarks of International Business Machines Corporation, registered in many jurisdictions worldwide.

As described herein, embodiments of the invention bind together subsets of software modules that have static dependencies in common. The bound subset of modules is then treated as a single module from the perspective of the dynamic dependency environment of the SRE. As a result, statically connected modules share a common lifecycle but can also be dynamically depended on by other modules. Thus software modules having static dependencies can be hosted in dynamic dependency environments while reducing risk of breaking those static dependencies with other modules.

An embodiment of the invention provides a method for managing a set of software modules in a software runtime environment, the set of software modules comprising one or more dynamic dependencies and one or more static dependencies, the method comprising the steps of: identifying a set of software modules; identifying each software module comprising a static dependency on another of the software modules; identifying each subset of the set of software modules interdependent by static dependencies; and in response to a change in state of a module in an identified subset, applying the change in state to all modules in the identified subset.

Embodiments of the invention identify statically interdependent program modules in the software runtime environment. Such identification of interdependent modules enables any requested change in the respective lifecycles of those interdependent modules, such as the starting, stopping, upgrading, replacement or removal to be applied to all the identified interdependent modules rather than a subset of one or more of them. For example, starting or stopping a first module that is statically depended on by a second module is highly likely to cause the second module or the software system of which it forms a part to crash. Such a crash is likely be caused by the second module's logic being reliant on the availability of the logic of the first modules. In embodiments of the invention, applying the lifecycle change to both the first and second modules, that is, to all of a given group statically interdependent modules, increases the reliability of the software program and computer of which those modules from a part.

The change in state may be applied only to the modules in the identified subset. This enables other groups of statically interdependent software modules to continue running while the subject group of statically interdependent software modules undergo a lifecycle change thus improving the resilience of the software program and computer of which those modules from a part.

In response to a change in state of a software module comprising only dynamic dependencies on other software modules, the change in state may only be applied to that software module. The set of software modules may be arranged together to provide an application program. One or more of the static dependencies may be identified prior to runtime. Each subset of software modules may be identified prior to runtime. A user initiating a change in state for a software module in an identified subset may be restricted to applying the change in state to all the software modules in the identified subset. The software modules comprising static dependencies may be contained in a wrapper for operation within the software runtime environment. The software modules comprising static dependencies may be Java™ software modules. The software runtime environment may be OSGi compliant.

Another embodiment provides apparatus for managing a set of software modules in a software runtime environment, the set of software modules comprising one or more dynamic dependencies and one or more static dependencies, the apparatus being operable to: identify a set of software modules; identify each software module comprising a static dependency on another of the software modules; identify each subset of the set of software modules interdependent by static dependencies; and in response to a change in state of a module in an identified subset, apply the change in state to all modules in the identified subset.

Embodiments of the invention provide a method or system substantially as described with reference to the figures.

Embodiments of the invention bind together subsets of software modules that have static dependencies in common. The bound subset of modules is then treated as a single module from the perspective of the dynamic dependency environment. As a result, statically connected modules share a common lifecycle but can also be dynamically depended on by other modules. Thus software modules having static dependencies can be hosted in dynamic dependency environments while reducing risk of breaking those static dependencies with other modules.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, radio frequency or any suitable combination of the foregoing.

Computer program code for carrying out operations for aspects of the present invention may be written in any combination of one or more programming languages, including an object oriented programming language such as Java™, Smalltalk™, C++™ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute by the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

What is claimed is:

1. A method for managing a set of software modules in a software runtime environment, the set of software modules comprising one or more dynamic dependencies and one or more static dependencies, the method comprising:
    identifying, by one or more processors, a set of software modules;
    identifying, by one or more processors, each software module that has a static dependency on another of the software modules;
    identifying, by one or more processors, each subset of the set of software modules that is interdependent with another subset of the set of software modules, wherein each subset of software modules is composed of software modules that are interdependent due to static dependencies between the software modules in the subset, wherein the software modules comprising static dependencies are contained in a wrapper for operation within the software runtime environment, and wherein identified subsets of the set of software modules are interdependent due to a dynamic dependency between the identified subsets of the set of software modules;
    in response to a change in state of a module in an identified subset, applying, by one or more processors, the change in state to all software modules in the identified subset, wherein the change in state is changing a state of the software module from a first state from a group of states consisting of upgraded, replaced and removed to a second state from the group of states consisting of upgraded, replaced and removed, wherein a user initiating a change in state for a software module in an identified subset is restricted to applying the change in state to all the software modules in the identified subset, and wherein the change in state is applied only to the software modules in the identified subset; and
    in response to a change in state of a software module comprising only dynamic dependencies on other software modules, applying, by one or more processors, the change in state only to that software module.

2. The method of claim 1, wherein the software modules are arranged together to provide an application program.

3. The method of claim 1, wherein one or more of the static dependencies are identified prior to runtime.

4. The method of claim 1, wherein each subset of software modules is identified prior to runtime.

5. A computer program product for managing a set of software modules in a software runtime environment, the set of software modules comprising one or more dynamic dependencies and one or more static dependencies, the computer program product comprising:

a non-transitory computer readable storage medium;

first program instructions to identify a set of software modules;

second program instructions to identify each software module having a static dependency on another of the software modules;

third program instructions to identify each subset of the set of software modules that is interdependent with another subset of the set of software modules, wherein each subset of software modules is composed of software modules that are interdependent due to static dependencies between the software modules in the subset, wherein the software modules comprising static dependencies are contained in a wrapper for operation within the software runtime environment, and wherein identified subsets of the set of software modules are interdependent due to a dynamic dependency between the identified subsets of the set of software modules;

fourth program instructions to, in response to a change in state of a module in an identified subset, apply the change in state to all software modules in the identified subset, wherein the change in state is changing a state of the software module from a first state from a group of states consisting of started, stopped, upgraded, replaced and removed to a second state from the group of states consisting of started, stopped, upgraded, replaced and removed, wherein a user initiating a change in state for a software module in an identified subset is restricted to applying the change in state to all the software modules in the identified subset, wherein the change in state is applied only to the software modules in the identified subset; and fifth program instructions to, in response to a change in state of a software module comprising only dynamic dependencies on other software modules, applying, by one or more processors, the change in state only to that software module; and wherein said first, second, third, fourth, and fifth program instructions are stored on said computer readable storage medium.

6. The computer program product of claim 5, wherein the software modules are arranged together to provide an application program.

7. The computer program product of claim 5, wherein one or more of the static dependencies are identified prior to runtime.

8. The computer program product of claim 5, wherein each subset of software modules is identified prior to runtime.

9. A computer system for managing a set of software modules in a software runtime environment, the set of software modules comprising one or more dynamic dependencies and one or more static dependencies, the computer system comprising:

a processor, a computer readable memory, and a computer readable storage medium;

first program instructions to identify a set of software modules;

second program instructions to identify each software module having a static dependency on another of the software modules;

third program instructions to identify each subset of the set of software modules that is interdependent with another subset of the set of software modules, wherein each subset of software modules is composed of software modules that are interdependent due to static dependencies between the software modules in the subset, wherein the software modules comprising static dependencies are contained in a wrapper for operation within the software runtime environment, and wherein identified subsets of the set of software modules are interdependent due to a dynamic dependency between the identified subsets of the set of software modules;

fourth program instructions to, in response to a change in state of a module in an identified subset, apply the change in state to all software modules in the identified subset, wherein the change in state is changing a state of the software module from a first state from a group of states consisting of started, stopped, upgraded, replaced and removed to a second state from the group of states consisting of started, stopped, upgraded, replaced and removed, wherein a user initiating a change in state for a software module in an identified subset is restricted to applying the change in state to all the software modules in the identified subset, wherein the change in state is applied only to the software modules in the identified subset; and fifth program instructions to, in response to a change in state of a software module comprising only dynamic dependencies on other software modules, applying, by one or more processors, the change in state only to that software module; and wherein said first, second, third, fourth, and fifth program instructions are stored on said computer readable storage medium for execution by said processor via said computer readable memory.

10. The computer system of claim 9, wherein the software modules are arranged together to provide an application program.

11. The computer system of claim 9, wherein one or more of the static dependencies are identified prior to runtime.

12. The computer system of claim 9, wherein each subset of software modules is identified prior to runtime.

* * * * *